US012028684B2

(12) United States Patent
Scheller

(10) Patent No.: US 12,028,684 B2
(45) Date of Patent: Jul. 2, 2024

(54) SPATIALLY DIFFERENTIATED NOISE REDUCTION FOR HEARING DEVICES

(71) Applicant: Starkey Laboratories, Inc., Eden Prairie, MN (US)

(72) Inventor: Thomas A. Scheller, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 193 days.

(21) Appl. No.: 17/816,026

(22) Filed: Jul. 29, 2022

(65) Prior Publication Data

US 2023/0034525 A1 Feb. 2, 2023

Related U.S. Application Data

(60) Provisional application No. 63/267,006, filed on Jan. 21, 2022, provisional application No. 63/203,797, filed on Jul. 30, 2021.

(51) Int. Cl.
*H04R 25/00* (2006.01)

(52) U.S. Cl.
CPC ......... *H04R 25/505* (2013.01); *H04R 25/405* (2013.01); *H04R 25/407* (2013.01); *H04R 25/554* (2013.01); *H04R 2225/43* (2013.01)

(58) Field of Classification Search
CPC .............. H04R 2225/43; H04R 25/505; H04R 25/554; H04R 2410/01; H04R 2430/20;
(Continued)

(56) References Cited

U.S. PATENT DOCUMENTS 8,396,234 B2 3/2013 Derleth et al.
8,942,387 B2 1/2015 Elko et al.
(Continued)

FOREIGN PATENT DOCUMENTS

EP 0652686 8/2002
EP 1278395 11/2009
(Continued)

OTHER PUBLICATIONS

"European Application Serial No. 22187717.8, Partial European Search Report dated Dec. 21, 2022", 13 pgs.
(Continued)

*Primary Examiner* — Phylesha Dabney
(74) *Attorney, Agent, or Firm* — Schwegman Lundberg & Woessner, P.A.

(57) ABSTRACT

Disclosed herein, among other things, are systems and methods for spatially differentiated noise reduction for hearing device applications. A method includes sensing sound signals with a hearing device. A front-facing directional beam and a rear-facing directional beam are produced using the sensed sound signals, and the front-facing directional beam and the rear-facing directional beam are combined to obtain an output directional beam. The front-facing directional beam or the output directional beam is compared to the rear-facing directional beam to determine a front-rear differential. Responsive to a determination that the front-rear differential indicates that the rear-facing directional beam is dominant, the amount of noise reduction of the output directional beam is increased. Responsive to a determination that the front-rear differential indicates that the rear-facing directional beam is not dominant, an amount of noise reduction of the output directional beam is reduced.

20 Claims, 8 Drawing Sheets

(58) Field of Classification Search
CPC .............. H04R 2460/01; H04R 25/405; H04R 25/407; H04R 3/005; H04R 1/1083; H04R 2225/55; H04R 2420/07; H04R 25/507; H04R 25/55
USPC .......................................................... 381/315
See application file for complete search history.

(56) References Cited

U.S. PATENT DOCUMENTS

| | | | |
|---|---|---|---|
| 9,143,857 | B2 | 9/2015 | Every et al. |
| 9,301,049 | B2 | 3/2016 | Elko et al. |
| 9,473,850 | B2 | 10/2016 | Konchitsky |
| 9,491,543 | B1 | 11/2016 | Konchitsky |
| 9,799,330 | B2 | 10/2017 | Nemala et al. |
| 10,015,589 | B1 | 7/2018 | Ebenezer |
| 10,176,823 | B2 | 1/2019 | Dusan et al. |
| 10,244,333 | B2 | 3/2019 | Mustiere et al. |
| 10,347,269 | B2 | 7/2019 | Van Hoesel et al. |
| 2008/0260175 | A1 | 10/2008 | Elko |
| 2009/0175466 | A1 | 7/2009 | Elko et al. |
| 2017/0164102 | A1 | 6/2017 | Ivanov |

FOREIGN PATENT DOCUMENTS

| | | | | |
|---|---|---|---|---|
| EP | 2973556 | | 7/2018 | |
| EP | 3668123 | A1 * | 6/2020 | ............... H04R 1/08 |
| EP | 4125276 | A2 * | 2/2023 | ........... H04R 25/405 |
| GB | 2561408 | | 10/2018 | |
| WO | 0197558 | | 12/2001 | |

OTHER PUBLICATIONS

Elko, Gary, “A simple adaptive first-order differential microphone”, IEEE Workshop on Application of Signal Processing to Audio and Acoustics, (Oct. 15, 1995), 4 pgs.

* cited by examiner

SPATIALLY DIFFERENTIATED NOISE REDUCTION FOR HEARING DEVICES

CROSS-REFERENCE TO RELATED APPLICATION

This patent application claims the benefit of U.S. Provisional Patent Application Nos. 63/203,797, filed Jul. 30, 2021 and 63/267,006, filed Jan. 21, 2022, each of which are incorporated by reference herein in their entirety.

TECHNICAL FIELD

This document relates generally to hearing device systems and more particularly to spatially differentiated noise reduction for hearing device applications.

BACKGROUND

Examples of hearing devices, also referred to herein as hearing assistance devices or hearing instruments, include both prescriptive devices and non-prescriptive devices. Specific examples of hearing devices include, but are not limited to, hearing aids, headphones, assisted listening devices, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

Hearing and understanding speech in a noisy environment can be challenging, especially for a hearing-impaired person. Improved methods of noise reduction for hearing devices are needed.

SUMMARY

Disclosed herein, among other things, are systems and methods for spatially differentiated noise reduction for hearing device applications. A method includes sensing sound signals with a hearing device. A front-facing directional beam and a rear-facing directional beam are generated using the sensed sound signals, and the front-facing directional beam and the rear-facing directional beam are combined using a directionality algorithm to obtain an output directional beam. The front-facing directional beam is compared to the rear-facing directional beam to determine a front-rear differential. Responsive to a determination that the front-rear differential indicates that the front-facing directional beam is dominant, an amount of noise reduction of the output directional beam is reduced. Responsive to a determination that the front-rear differential indicates that the rear-facing directional beam is dominant, the amount of noise reduction of the output directional beam is increased.

Various aspects include a method for spatially differentiated noise reduction. The method includes sensing sound signals with a hearing device. A front-facing directional beam and a rear-facing directional beam are generated using the sensed sound signals, and the front-facing directional beam and the rear-facing directional beam are combined using a directionality algorithm to obtain an output directional beam. The output directional beam is compared to the rear-facing directional beam to determine an output-rear differential. Responsive to a determination that the output-rear differential indicates that the output directional beam is dominant, an amount of noise reduction of the output directional beam is reduced. Responsive to a determination that the output-rear differential indicates that the rear-facing directional beam is dominant, the amount of noise reduction of the output directional beam is increased.

Various aspects of the present subject matter include a hearing device including two or more microphones configured to sense sound signals, and one or more processors. The one or more processors are programmed to generate a front-facing directional beam and a rear-facing directional beam using outputs of the two or more microphones, and combine the front-facing directional beam and the rear-facing directional beam using a directionality algorithm to obtain output directional beam. The front-facing directional beam or the output directional beam is compared to the rear-facing directional beam to determine a front-rear differential. Responsive to a determination that the front-rear differential indicates that the rear-facing directional beam is dominant, the amount of noise reduction of the output directional beam is increased. Responsive to a determination that the front-rear differential indicates that the rear-facing directional beam is not dominant, an amount of noise reduction of the output directional beam is reduced.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1A:
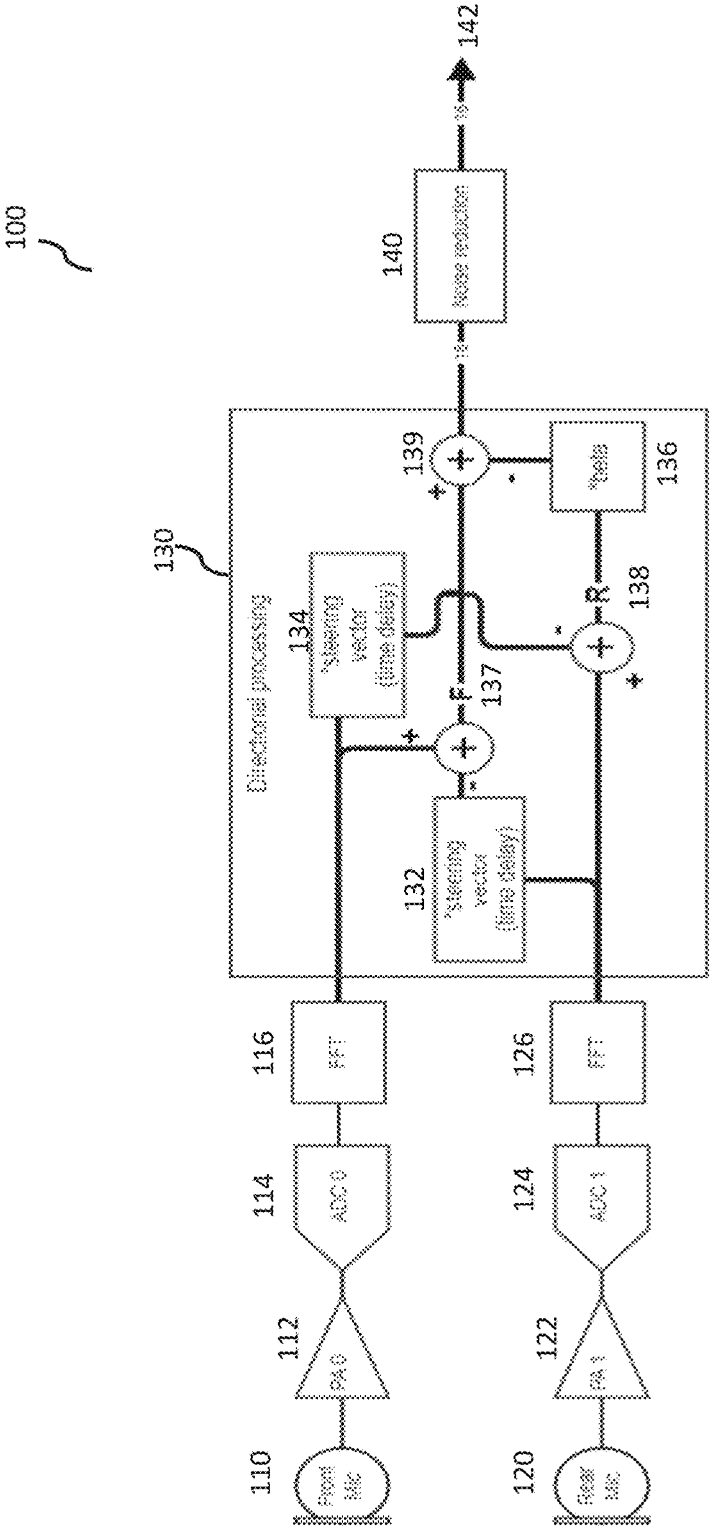
FIG. 1A illustrates a block diagram of a system including a directionality block followed by a noise reduction block for hearing devices.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment, including combinations of such embodiments. The following detailed description is demonstrative and not to be taken in a limiting sense. The scope of the present subject matter is defined by the appended claims, along with the full scope of legal equivalents to which such claims are entitled.

The present detailed description will discuss hearing devices generally, including earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

Hearing and understanding in a noisy environment is challenging for anyone, but especially for hearing impaired patients. Speech understanding in a noisy environment is a common complaint for hearing aid wearers. Often, the source of the speech is in front of the hearing aid wearer. Directionality has been shown to be beneficial for hearing speech in noise, while current noise reduction (NR) algorithms provide comfort without significantly improving intelligibility.

Previously, directionality algorithms and noise reduction algorithms have been applied separately and consecutively to clean up a received audio signal. Directionality algorithms may employ adaptive null-steering in multiple bands to minimize the power from the rear, while not degrading the signal at 0 degrees azimuth (directly in front of the listener). These directionality algorithms can produce up to 6 dB signal-to noise ratio (SNR) improvement in noisy environments, with good sound quality.

Noise reduction algorithms can further improve the SNR by 2-3 dB, depending on number of bands and acceptance of sound artifacts. Especially when the environmental SNR is near 0 dB, it is exceedingly difficult for any algorithm to differentiate between speech and noise. There is a balancing act between reduction of speech, reduction of noise, and willingness to accept audio artifacts due to the fast processing of the signal in multiple independent frequency bands. It is possible to use the rear-facing beam, e.g. the rear-facing cardioid beam, as input to the noise estimator of the NR algorithm, and the front-facing beam, e.g. the front-facing cardioid as the input to the speech estimator of the NR algorithm. This can help to improve the instantaneous SNR estimate that is a part of any NR algorithm, and thereby reduce artifacts.

FIG. 1A illustrates a block diagram of a system 100 for noise reduction for hearing devices. Most hearing aids include some type of directionality and noise reduction, and the directionality algorithm is typically followed by the noise reduction algorithm. A front microphone 110 of a hearing device produces a signal which is amplified by a first amplifier 112, converted by a first analog-to-digital converter 114, and transformed using a first transformer 116, such as a fast Fourier transformer (FFT). A rear microphone 120 of a hearing device produces a signal which is amplified by a second amplifier 122, converted by a second analog-to-digital converter 124, and transformed using a second transformer 126, such as an FFT. Directional processing 130 is applied, including applying a first steering vector 132, a second steering vector 134, a multiplication factor 136, and a series of comparisons 137, 138, 139. Directional processing and noise reduction processing may be performed on a sub-band basis. In addition, broad-band directional processing may be followed by filtering (such as FFT), followed by sub-band noise reduction, where the sub-band noise reduction blocks can be steered by a single wideband directional block. In prior systems, noise reduction processing 140 was performed subsequently to and independently of the directional processing 130, to produce an output signal 142.

Most directional beamformers in hearing aids employ two omnidirectional (omni) microphones. The output of the two microphones are combined to form a front-facing cardioid directivity pattern (or directional beam) and a rear-facing cardioid directivity pattern (or directional beam). From these two opposing cardioid patterns a combined pattern can be formed with a variable null angle, known as the Elko-Yong algorithm, to allow for adaptive null steering to maximally cancel noise in the rear hemisphere. In order for this adapted-null beam to optimally create a beam, the two microphones must be well matched. Any signal processing differentially applied before beamforming, such as noise reduction, will destroy the beam integrity. Consequently, it is currently not possible to integrate noise reduction directly with directionality.

According to various embodiments of the present subject matter, the present systems and methods provide for improved hearing in noisy environments, by making use of spatial information, or directionality, in combination with noise reduction. The present subject matter applies noise reduction differentially depending on whether the instantaneous signal is more likely to be originating in front of the listener (hearing device wearer) or behind the listener.

Figure 1B:
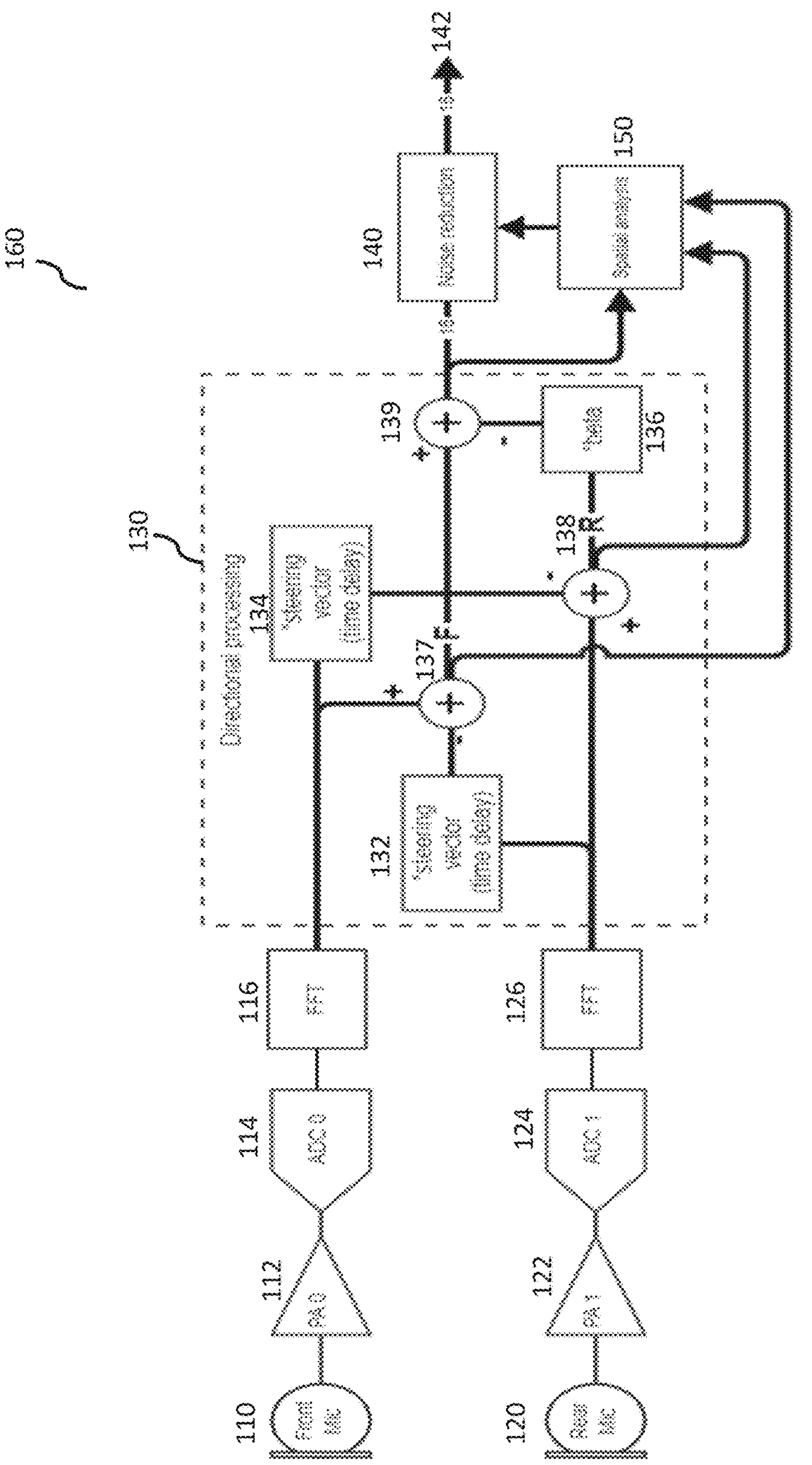
FIG. 1B illustrates a block diagram of a system for spatially differentiated noise reduction for hearing devices, according to various embodiments of the present subject matter.

FIG. 1B illustrates a block diagram of a system 160 for spatially differentiated noise reduction for hearing devices, according to various embodiments of the present subject matter. As shown in FIG. 1B, the present subject matter applies noise reduction 140 differentially depending on whether the instantaneous signal is more likely to be coming from the front or rear hemisphere of the listener, in various embodiments. The present subject matter performs a spatial analysis 150 to determine whether to increase or decrease noise reduction (or maximum noise reduction). The spatial analysis 150 may calculate separately the power of a front-facing directional beam, a rear-facing directional beam, and a directional beamformer output.

Additionally or alternatively, the two opposing directional beams, such as fixed-pattern cardioids, (front, rear) can be compared to each other, and/or to the adapted-null beam (the output of the directionality algorithm). If the momentary comparison between the fixed cardioids is stronger to the rear, the present subject matter may apply more noise reduction to the adapted-null beam output. If the comparison shows that the front-facing cardioid is dominant, the present subject matter may apply less noise reduction to the adapted-null beam output.

The spatial analysis 150 may include smoothing of the power of the front-facing directional beam, a rear-facing directional beam, and a directional beamformer output, in various embodiments, Optionally, the spatial analysis 150 calculates a difference as rear-facing directional beam power minus directional beamformer output power. Additionally or alternatively, the spatial analysis 150 calculates a difference as rear-facing directional beam power minus front-facing directional beam power. In either case, the difference results in a weighting value per frequency band. The per-band weighting values may be combined across bands to produce a smaller number of frequency band weighting values, in various examples. Additionally or alternatively, the weighting values may be smoothed before being incorporated into a noise reduction calculation.

Noise reduction can have two aspects, an underlying noise reduction algorithm that calculates instantaneous values of gain reduction per frequency band, and a slow-moving limit to the maximum gain reduction that can be applied. The noise reduction 140 may be performed using weighting values calculated by the spatial analysis 150. The weighting of the noise reduction can be accomplished in different ways in different embodiments. In various examples, the weighting value can be applied to either the noise reduction limit (i.e., maximum noise reduction) or to the noise reduction itself. In some additional or alternative examples, the weighting value can be used as an additive factor, such that the difference between the rear directional beam and the front directional beam(or directional beamformer output) can be added to the limit (e.g., modified_NR_limit=NR_limit+weighting value). In other examples, the weighting value can be used as a multiplicative factor, such that the difference between the rear directional beam and the front directional beam (or directional beamformer output) can for a multiplier on the limit or the NR itself (e.g., modified_NR_limit=NR_limit*weighting value*c, where c is a scaling factor).

According to various embodiments, processing may be done on a subband basis, to provide for subband noise reduction to be applied with spatial information. Thus, in the present subject matter signals from the front are minimally disrupted, while signals from the rear can be maximally noise reduced, without corrupting the target speech signal in front of the listener. Optionally, the spatially differentiated noise reduction can be applied without disrupting the beamformer. The combination of spatial information and noise reduction may be accomplished in one of a plurality of methods. In one example the front-rear differential could serve as a logical switch, whereby if front sound is dominating, the noise reduction is limited to a maximum value x, and if rear sound is dominating, noise reduction is limited to a maximum value y. This method may be extended to a plurality of front-rear differentials, in various embodiments. In another alternative or additional example, the front-rear differential could be a continuous function adding to or subtracting from the maximum noise reduction. In a further alternative or additional example, the front-rear differential may form a multiplier on the maximum noise reduction. In other additional or alternative examples, the front-rear differential may be applied to the underlying noise reduction, rather than the maximum noise reduction.

Figure 1C:
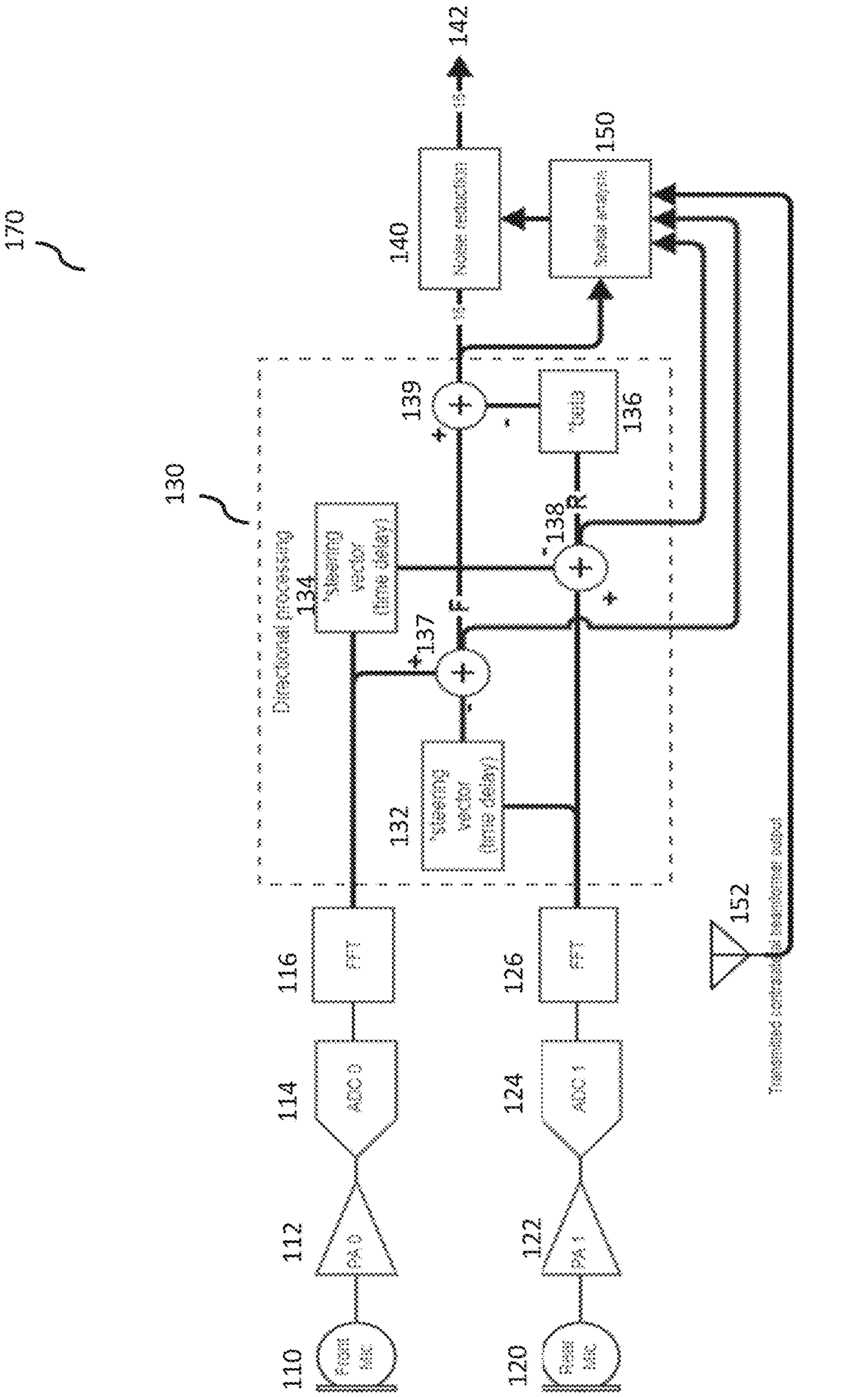
FIG. 1C illustrates a block diagram of a system for binaural spatially differentiated noise reduction for hearing devices, according to various embodiments of the present subject matter.

FIG. 1C illustrates a block diagram of a system 170 for binaural spatially differentiated noise reduction for hearing devices, according to various embodiments of the present subject matter. As discussed above, FIG. 1B illustrates spatially-differentiated noise reduction for a single monaural hearing aid. In FIG. 1C, spatially-differentiated noise reduction is performed for a binaurally-fit pair of hearing aids, as a single system (including an inter-device or left/right comparison). The left and right hearing aids can bi-directionally transmit their respective received audio information to the opposite ear, or to a third device such as a mobile phone for processing. In one example, the directional beamformer output (and/or the front and rear contralateral signals) can be streamed to the opposite ear using wireless communication, and received using an antenna 152. The received contralateral beamformer output (and/or the front and rear contralateral signals) from the opposite ear is a fourth input to spatial analysis block 150, in various examples.

Using this additional fourth input, the spatial analysis block can perform a left-right (or inter-device) comparison in addition to the front-back comparison of the single monaural aid. In one example, the input can be used to further emphasize the front ipsilateral signal by increasing the amount of noise reduction when the contralateral noise dominates the signal. In an additional or alternative example, the ipsilateral and contralateral signals are compared to each other to generate separate medial and lateral energy measures (one or more inter-device comparisons). The medial and lateral energy measures can be used by the noise reduction block 140 to provide more aggressive noise reduction for lateral signals, and less aggressive noise reduction for medial (or common) signals, in an example. In various embodiments, either or both of the left-right (inter-device) or medial-lateral refinements to noise reduction described herein are performed in addition to the front-back noise reduction refinements described with respect to FIG. 1B above.

The present subject matter can perform a three-way comparison using the front ipsilateral signal (or beamformed ipsilateral signal), the rear ipsilateral signal and the beamformed contralateral signal, in an example, to obtain an evaluation of the spatial audio scene for adjusting noise reduction. Thus, the device of the present system may include one or more processors programmed to receive a wireless signal indicative of a second output directional beam from a second hearing device, compare the received second output directional beam to the front-facing directional beam or the output directional beam, and/or to the rear-facing directional beam, to perform an inter-device comparison, and increase or decrease an amount of noise reduction of the output directional beam based on the inter-device comparison.

In yet another alternative or additional embodiment, both the front- and rear-facing information can be transmitted to the contralateral side (or separate device processor) and used to generate a four-quadrant spatial map, including left-front, left-rear, right-front, and right-rear components. In various examples, the spatial analysis block can perform comparisons between these four quadrants in multiple simultaneous frequency bands to provide for sophisticated spatial steering of noise reduction, as well as isolation of signals of interest at angles anywhere in the azimuthal plane.

Thus, the device of the present system may include one or more processors programmed to receive wireless signals indicative of a second front-facing directional beam and a second rear-facing directional beam from a second hearing device, generate a four-quadrant spatial map using the second front-facing directional beam, the second rear-facing directional beam, the front-facing directional beam, and the rear-facing directional beam, and perform spatial steering of noise reduction using the four-quadrant spatial map. The one or more processors may be further programmed to isolate signals of interest from the sensed sound signals using the four-quadrant spatial map, in one example.

Figure 2A:
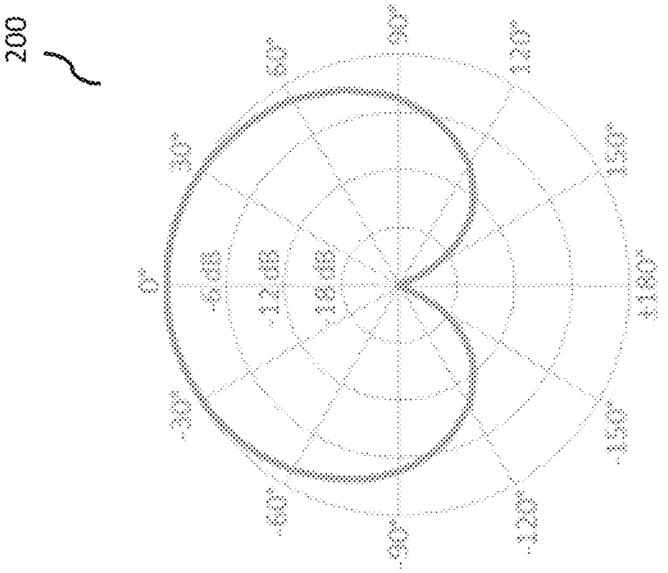
FIG. 2A illustrates a graphical diagram of a directional beam produced using combined outputs of hearing device microphones, according to various embodiments of the present subject matter.
Figure 2B:
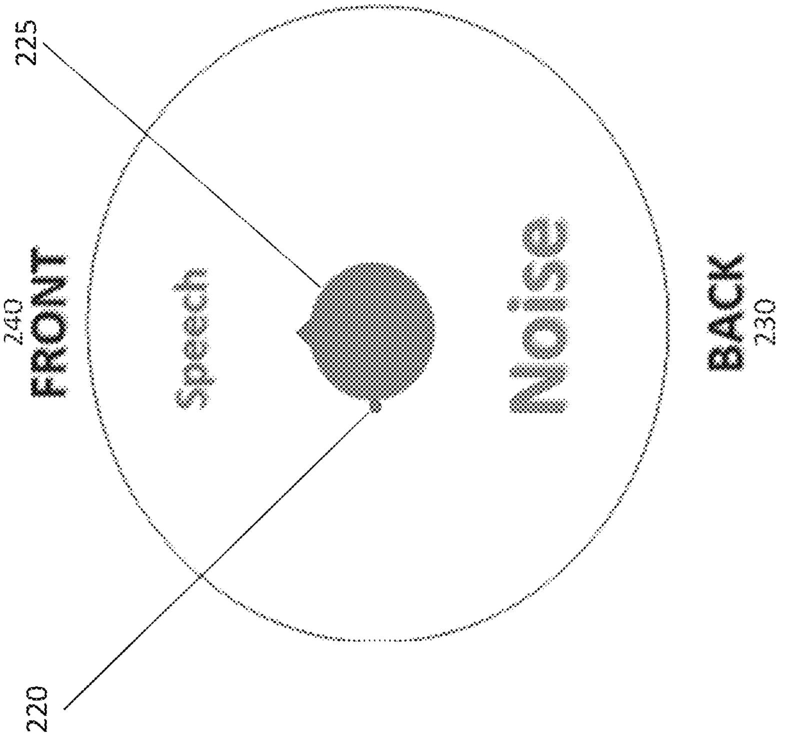
FIG. 2B illustrates a top view of a person wearing a hearing device, according to various embodiments of the present subject matter.

FIG. 2A illustrates a graphical diagram of a directional beam 200, in this embodiment a cardioid pattern, produced using combined outputs of hearing device microphones, according to various embodiments of the present subject matter. In the depicted example, the directional beam 200 is a front-facing cardioid pattern with a null at 180 degrees. A rear-facing cardioid pattern includes a null at 0 degrees. FIG. 2B illustrates a hearing device 220 worn by a wearer 225, according to various embodiments of the present subject matter. The sound sensed by microphones of the hearing device 220 include a front component 240 and a rear component 230, in various examples. In various embodiments, the hearing device 220 includes one or more processors for performing directional analysis, noise reduction, spatial analysis, and a combination thereof. In other additional or alternative examples, a portion or all of the above processing may be performed by a device external to the hearing device, such as a personal computer, mobile device (such as a smart phone or tablet) or programmer.

Figure 3A:
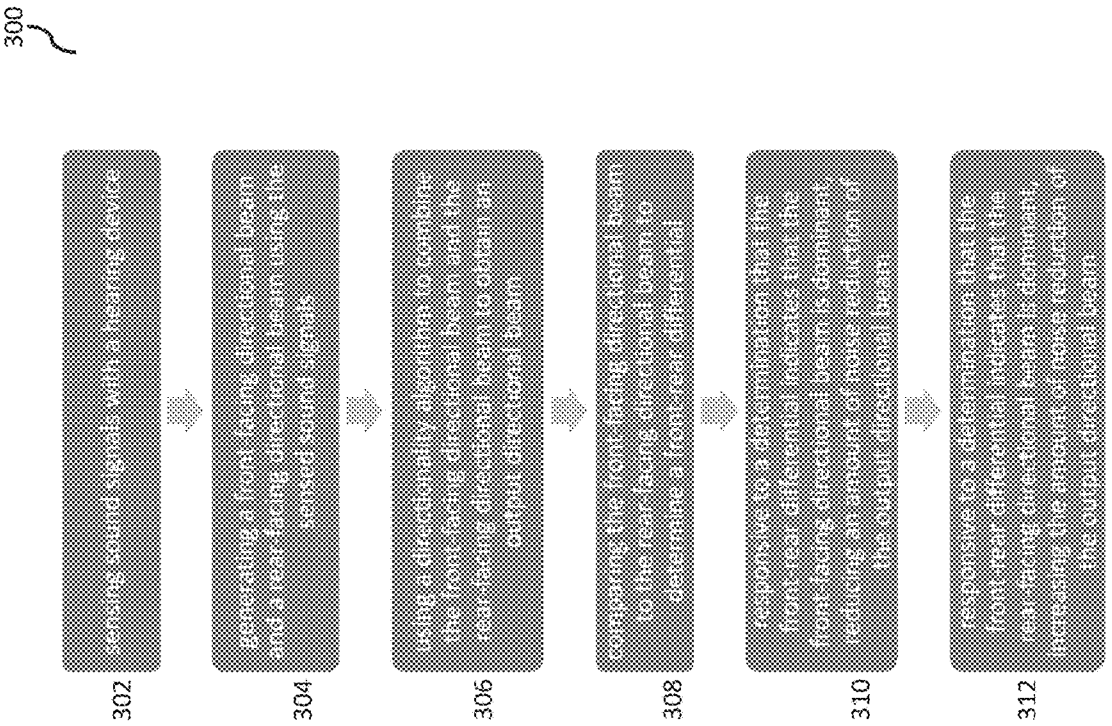
FIGS. 3A-3B illustrate flow diagrams of methods of spatially differentiated noise reduction for hearing devices, according to various embodiments of the present subject matter.

FIG. 3A illustrates a flow diagram of a method 300 of spatially differentiated noise reduction for hearing devices, according to various embodiments of the present subject matter. The method 300 includes sensing sound signals a hearing device, at step 302. At step 304, a front-facing directional beam and a rear-facing directional beam are generated using the sensed sound signals. In some examples, the hearing device includes two or more microphones to sense the sound signals, and the combined outputs of the two or more microphones are used to generate the directional beams. Other additional or alternative examples include single microphones with multiple ports that generate the fixed directional beam(s). The front-facing directional beam and the rear-facing directional beam are combined using a directionality algorithm to obtain an output directional beam, such as an adapted null beam output, at step 306. The front-facing directional beam (in some embodiments, a front-facing cardioid pattern) is compared to the rear-facing directional beam (in some embodiments, a rear-facing cardioid pattern) to determine a front-rear differential, at step 308. Responsive to a determination that the front-rear differential indicates that the front-facing directional beam is dominant, an amount of noise reduction of the output directional beam is reduced at step 310. Responsive to a determination that the front-rear differential indicates that the rear-facing directional beam is dominant, the amount of noise reduction of the output directional beam is increased at step 312.

According to various embodiments, comparing the front-facing directional beam to the rear-facing directional beam includes performing a momentary comparison, A spatial analysis may be used to calculate a front-facing power, a rear-facing power, and a directional power using the front-facing directional beam, the rear-facing directional beam and the output directional beam, Comparing the front-facing directional beam to the rear-facing directional beam includes subtracting the front-facing power from the rear-facing power, in various examples. In some additional or alternative examples, the subtraction is performed on a subband frequency basis to determine a weighting value per subband. The weighting value is applied to a noise reduction limit or maximum per subband to increase or decrease noise reduction, in some embodiments. In other examples, the weighting value is applied to a noise reduction calculation per subband to increase or decrease noise reduction. For example, the weighting value can be applied as a multiplier in the noise reduction calculation, or the weighting value can be applied as an addition or subtraction in the noise reduction calculation, or in some combination of the two.

Figure 3B:
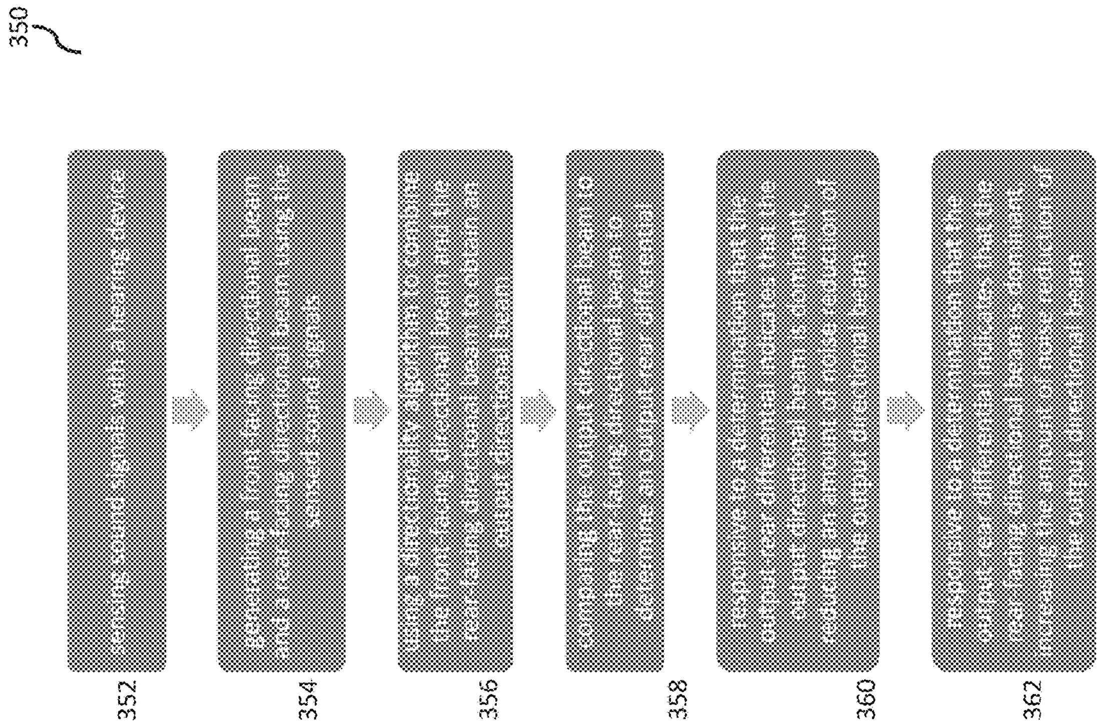

FIG. 3B illustrates a flow diagram of a method 350 of spatially differentiated noise reduction for hearing devices, according to various embodiments of the present subject matter. The method 350 includes sensing sound signals with a hearing device, at step 352. At step 354, a front-facing directional beam and a rear-facing directional beam are generated using the sensed sound signals, such as by using combined outputs of a first microphone and a second microphone of the hearing device. The front-facing directional beam (such as a first cardioid pattern) and the rear-facing directional beam (such as a second cardioid pattern) are combined using a directionality algorithm to obtain an output directional beam (such as an adapted null beam output), at step 356, The output directional beam is compared to the rear-facing directional beam to determine an output-rear differential, at step 358. Responsive to a determination that the output-rear differential indicates that the output directional beam is dominant, an amount of noise reduction of the output directional beam is reduced at step 360. Responsive to a determination that the output-rear differential indicates that the rear-facing directional beam is dominant, the amount of noise reduction of the output directional beam is increased at step 362.

In various embodiments, a spatial analysis is used to calculate a front-facing power, a rear-facing power, and a directional power using the front-facing directional beam, the rear-facing directional beam and the output directional beam. Comparing the output directional beam to the rear-facing directional beam includes subtracting the directional power from the rear-facing power, in various examples. In some additional or alternative examples, the subtraction is performed on a subband frequency basis to determine a weighting value per subband.

Various aspects of the present subject matter include a hearing device including two or more microphones configured to sense sound signals, and one or more processors. The one or more processors are programmed to generate a front-facing directional beam and a rear-facing directional beam using outputs of the two or more microphones, and combine the front-facing directional beam and the rear-facing directional beam using a directionality algorithm to obtain an output directional beam. The front-facing directional beam or the output directional beam is compared to the rear-facing directional beam to determine a front-rear differential. Responsive to a determination that the front-rear differential indicates that the rear-facing directional beam is dominant, the amount of noise reduction of the output directional beam is increased. Responsive to a determination that the front-rear differential indicates that the rear-facing directional beam is not dominant, an amount of noise reduction of the output directional beam is reduced.

According to various embodiments, the two or more microphones include an omnidirectional microphone. Other types of microphones can be used additionally or alternatively. In some embodiments, the two or more microphones include a first microphone and a second microphone. The first microphone includes a front microphone, and the second microphone includes a rear microphone, in various embodiments. In some additional or alternative embodiments, the hearing device is a hearing aid. Optionally, the hearing device is an earbud. In various additional or alternative examples, the present subject matter processes a front beamformer and a rear beamformer separately to determine if either or both are predominately speech or predominately noise, and then uses the result to change a noise reduction calculation. Optionally, each individual hearing device performs the spatially differentiated noise reduction. In other additional or alternative examples, spatially differentiated noise reduction is performed using data from each of a left and right hearing device.

The present subject matter provide for improved hearing in noisy environments, by making use of spatial information in combination with noise reduction. For example, the present subject matter provides for more aggressive noise reduction when the sensed sound is from behind a listener (such that artifacts from aggressive noise reduction may be tolerated), and provides for less aggressive noise reduction when the sensed sound is from in front of a listener where maximum speech intelligibility is desired.

Figure 4:
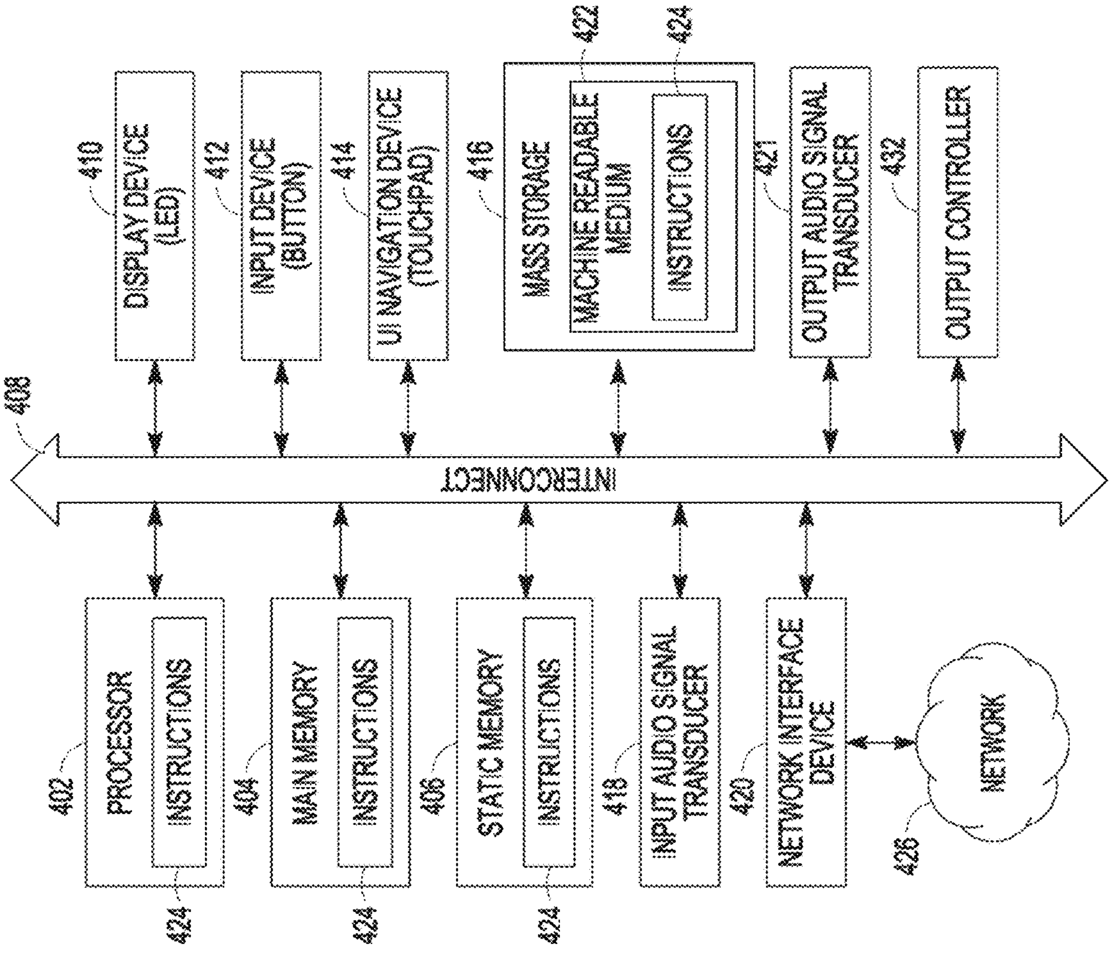
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internee protocol (IP), transmission control protocol (TCP), user datagram protocol (LDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various embodiments of the present subject matter support wireless communications with a hearing device. In various embodiments the wireless communications may include standard or nonstandard communications. Some examples of standard wireless communications include link protocols including, but not limited to, Bluetooth™, Bluetooth™ Low Energy (BLE), IEEE 802.11(wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NTMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some embodiments. The present subject matter may be used in devices whether such devices are standard or custom fit and whether they provide an open or an occlusive design. It is understood that other hearing devices not expressly stated herein may be used in conjunction with the present subject matter.

The description can be described further with respect to the following consistory clauses:

1. A method, comprising:

sensing sound signals with a hearing device;

generating a front-facing directional beam and a rear-facing directional beam using the sensed sound signals;

using a directionality algorithm to combine the front-facing directional beam and the rear-facing directional beam to obtain an output directional beam;

comparing the front-facing directional beam to the rear-facing directional beam to determine a front-rear differential;

responsive to a determination that the front-rear differential indicates that the front-facing directional beam is dominant, reducing an amount of noise reduction of the output directional beam; and responsive to a determination that the front-rear differential indicates that the rear-facing directional beam is dominant, increasing the amount of noise reduction of the output directional beam.

2. The method of clause 1, wherein comparing the front-facing directional beam to the rear-facing directional beam includes performing a momentary comparison.

3. The method of clause 1, comprising using a spatial analysis to calculate a front-facing power, a rear-facing power, and a directional power using the front-facing directional beam, the rear-facing directional beam and the output directional beam.

4. The method of clause 3, wherein comparing the front-facing directional beam to the rear-facing directional beam includes subtracting the front-facing power from the rear-facing power.

5. The method of clause 4, wherein the subtraction is performed on a subband frequency basis to determine a weighting value per subband.

6. The method of clause 5, wherein the weighting value is applied to a noise reduction limit or maximum per subband to increase or decrease noise reduction.

7. The method of clause 6, wherein the weighting value is applied as a multiplier.

8. The method of clause 6, wherein the weighting value is applied as an addition or subtraction.

9. The method of clause 5, wherein the weighting value is applied to a noise reduction calculation per subband to increase or decrease noise reduction.

10. The method of clause 9, wherein the weighting value is applied as a multiplier in the noise reduction calculation.

11. The method of clause 9, wherein the weighting value is applied as an addition or subtraction in the noise reduction calculation.

12. A method, comprising:

sensing sound signals with a hearing device;

generating a front-facing directional beam and a rear-facing directional beam using the sensed sound signals;

using a directionality algorithm to combine the front-facing directional beam and the rear-facing directional beam to obtain an output directional beam;

comparing the output directional beam to the rear-facing directional beam to determine an output-rear differential;

responsive to a determination that the output-rear differential indicates that the output directional beam is dominant, reducing an amount of noise reduction of the output directional beam; and responsive to a determination that the output-rear differential indicates that the rear-facing directional beam is dominant, increasing the amount of noise reduction of the output directional beam.

13. The method of clause 12, comprising using a spatial analysis to calculate a front-facing power, a rear-facing power, and a directional power using the front-facing directional beam, the rear-facing directional beam and the output directional beam.

14. The method of clause 13, wherein comparing the output directional beam to the rear-facing directional beam includes subtracting the directional power from the rear-facing power.

15. The method of clause 14, wherein the subtraction is performed on a subband frequency basis to determine a weighting value per subband.

16. A hearing device, comprising:

two or more microphones configured to sense sound signals; and one or more processors programmed to:

generate a front-facing directional beam and a rear-facing directional beam using outputs of the two or more microphones;

use a directionality algorithm to combine the front-facing directional beam and the rear-facing directional beam to obtain an output directional beam;

compare the front-facing directional beam or the output directional beam to the rear-facing directional beam to determine a differential;

responsive to a determination that the differential indicates that the rear-facing directional beam is dominant, increase an amount of noise reduction of the output directional beam; and responsive to a determination that the differential indicates that the rear-facing directional beam is not dominant, reduce the amount of noise reduction of the output directional beam.

17. The hearing device of clause 16, wherein the two or more microphones include an omnidirectional microphone.

18. The hearing device of clause 16, wherein the one or more processors are further programmed to:

receive a wireless signal indicative of a second output directional beam from a second hearing device;

compare the received second output directional beam to the front-facing directional beam or the output directional beam, and to the rear-facing directional beam, to perform an inter-device comparison; and increase or decrease an amount of noise reduction of the output directional beam based on the inter-device comparison.

19. The hearing device of clause 16, wherein the one or more processors are further programmed to:

receive wireless signals indicative of a second front-facing directional beam and a second rear-facing directional beam from a second hearing device;

generate a four-quadrant spatial map using the second front-facing directional beam, the second rear-facing directional beam, the front-facing directional beam, and the rear-facing directional beam; and perform spatial steering of noise reduction using the four-quadrant spatial map.

20. The hearing device of clause 19, wherein the one or more processors are further programmed to:

isolate signals of interest from the sensed sound signals using the four-quadrant spatial map.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

The invention claimed is:

1. A method, comprising:

sensing sound signals with a hearing device;

generating a front-facing directional beam and a rear-facing directional beam using the sensed sound signals;

using a directionality algorithm to combine the front-facing directional beam and the rear-facing directional beam to obtain an output directional beam;

comparing the front-facing directional beam to the rear-facing directional beam to determine a front-rear differential;

responsive to a determination that the front-rear differential indicates that the front-facing directional beam is dominant, reducing an amount of noise reduction of the output directional beam; and responsive to a determination that the front-rear differential indicates that the rear-facing directional beam is dominant, increasing the amount of noise reduction of the output directional beam.

2. The method of claim 1, wherein comparing the front-facing directional beam to the rear-facing directional beam includes performing a momentary comparison.

3. The method of claim 1, comprising using a spatial analysis to calculate a front-facing power, a rear-facing power, and a directional power using the front-facing directional beam, the rear-facing directional beam and the output directional beam.

4. The method of claim 3, wherein comparing the front-facing directional beam to the rear-facing directional beam includes subtracting the front-facing power from the rear-facing power.

5. The method of claim 4, wherein the subtraction is performed on a subband frequency basis to determine a weighting value per subband.

6. The method of claim 5, wherein the weighting value is applied to a noise reduction limit or maximum per subband to increase or decrease noise reduction.

7. The method of claim 6, wherein the weighting value is applied as a multiplier.

8. The method of claim 6, wherein the weighting value is applied as an addition or subtraction.

9. The method of claim 5, wherein the weighting value is applied to a noise reduction calculation per subband to increase or decrease noise reduction.

10. The method of claim 9, wherein the weighting value is applied as a multiplier in the noise reduction calculation.

11. The method of claim 9, wherein the weighting value is applied as an addition or subtraction in the noise reduction calculation.

12. A method, comprising:

sensing sound signals with a hearing device;

generating a front-facing directional beam and a rear-facing directional beam using the sensed sound signals;

using a directionality algorithm to combine the front-facing directional beam and the rear-facing directional beam to obtain an output directional beam;

comparing the output directional beam to the rear-facing directional beam to determine an output-rear differential;

responsive to a determination that the output-rear differential indicates that the output directional beam is dominant, reducing an amount of noise reduction of the output directional beam; and responsive to a determination that the output-rear differential indicates that the rear-facing directional beam is dominant, increasing the amount of noise reduction of the output directional beam.

13. The method of claim 12, comprising using a spatial analysis to calculate a front-facing power, a rear-facing power, and a directional power using the front-facing directional beam, the rear-facing directional beam and the output directional beam.

14. The method of claim 13, wherein comparing the output directional beam to the rear-facing directional beam includes subtracting the directional power from the rear-facing power.

15. The method of claim 14, wherein the subtraction is performed on a subband frequency basis to determine a weighting value per subband.

16. A hearing device, comprising:

two or more microphones configured to sense sound signals;

and one or more processors programmed to:

generate a front-facing directional beam and a rear-facing directional beam using outputs of the two or more microphones;

use a directionality algorithm to combine the front-facing directional beam and the rear-facing directional beam to obtain an output directional beam;

compare the front-facing directional beam or the output directional beam to the rear-facing directional beam to determine a differential;

responsive to a determination that the differential indicates that the rear-facing directional beam is dominant, increase an amount of noise reduction of the output directional beam; and responsive to a determination that the differential indicates that the rear-facing directional beam is not dominant, reduce the amount of noise reduction of the output directional beam.

17. The hearing device of claim 16, wherein the two or more microphones include an omnidirectional microphone.

18. The hearing device of claim 16, wherein the one or more processors are further programmed to:

receive a wireless signal indicative of a second output directional beam from a second hearing device;

compare the received second output directional beam to the front-facing directional beam or the output directional beam, and to the rear-facing directional beam, to perform an inter-device comparison; and increase or decrease an amount of noise reduction of the output directional beam based on the inter-device comparison.

19. The hearing device of claim 16, wherein the one or more processors are further programmed to:

receive wireless signals indicative of a second front-facing directional beam and a second rear-facing directional beam from a second hearing device;

generate a four-quadrant spatial map using the second front-facing directional beam, the second rear-facing directional beam, the front-facing directional beam, and the rear-facing directional beam; and perform spatial steering of noise reduction using the four-quadrant spatial map.

20. The hearing device of claim 19, wherein the one or more processors are further programmed to:

isolate signals of interest from the sensed sound signals using the four-quadrant spatial map.

* * * * *